(12) United States Patent
Baumann et al.

(10) Patent No.: US 6,362,914 B2
(45) Date of Patent: Mar. 26, 2002

(54) ELECTROCHROMIC MATERIALS WITH ENHANCED ULTRAVIOLET STABILITY AND DEVICES COMPRISING SAME

(75) Inventors: Kelvin L. Baumann; Thomas F. Guarr, both of Holland; David A. Theiste, Byron Center, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/794,512

(22) Filed: Feb. 27, 2001

Related U.S. Application Data

(63) Continuation of application No. 09/366,115, filed on Aug. 2, 1999, now Pat. No. 6,195,192.

(51) Int. Cl.[7] .............................. G02F 1/15; G02F 1/153
(52) U.S. Cl. ...................... 359/265; 359/273; 359/275; 252/583; 544/347; 546/257
(58) Field of Search .................. 359/265, 270, 359/271, 273, 275, 272; 252/582, 583; 544/347; 546/257; 525/540

(56) References Cited

U.S. PATENT DOCUMENTS

| | | | |
|---|---|---|---|
| 5,128,013 A | * 7/1992 | Helms | ........................ 359/265 |
| 5,137,991 A | 8/1992 | Epstein et al. | ............... 525/540 |
| 5,928,572 A | * 7/1999 | Tonar et al. | ................. 252/583 |
| 5,998,617 A | * 12/1999 | Srinivasa et al. | ........... 544/347 |
| 6,020,987 A | * 2/2000 | Baumann et al. | ........... 359/273 |
| 6,037,471 A | * 3/2000 | Srinivasa et al. | ........... 546/257 |
| 6,141,137 A | * 10/2000 | Byker et al. | ................. 359/265 |

OTHER PUBLICATIONS

Summers, Lindsay A., "Diquaternary Salts of 4,4'–Bipyridine as Electron Relays for the Photoreduction of Water",J. Hetercyclic Chem., vol.28, Jun.–Jul. 1991, pp. 827–842 Rytz.

Gerhard et al., "Light Stabilizers", Chimia 48 (1994), Nr. 9 (Sep.).

Lau, Wayne W.Y., "Polymeric Stabilizers and Antioxidants", Desk Reference of Functional Polymers: Syntheses and Applications, Chap. 4.5, pp. 621–634, Aug. 1997.

* cited by examiner

*Primary Examiner*—Loha Ben
(74) *Attorney, Agent, or Firm*—Brian J. Rees; Factor & Partners, LLC

(57) ABSTRACT

Electrochromic devices and materials having enhanced daylight stability are described. The materials have a redox center linked to an energy receptor site that may serve to dissipate excited state energy from the redox center, alternatively the receptor site may absorb harmful radiation prior to the absorption by the redox center.

22 Claims, 1 Drawing Sheet

ELECTROCHROMIC MATERIALS WITH ENHANCED ULTRAVIOLET STABILITY AND DEVICES COMPRISING SAME

CROSS-REFERENCE TO RELATED APPLICATION(S)

This application is a continuation of U.S. application Ser. No. 09/366,115, filed Aug. 2, 1999, now U.S. Pat. No. 6,195,192.

BACKGROUND OF THE INVENTION

The invention generally relates to devices of variable transmission to electromagnetic radiation, more particularly the invention relates to materials with enhanced UV stability for use in these devices.

Devices of variable transmittance to electromagnetic radiation have found application as the variable transmittance element in variable transmittance light filters, variable reflectance mirrors and display devices, which employ such light filters or mirrors to display information. Architectural windows, skylights, automotive windows and sunroofs are also included in these light filters. Variable reflectance mirrors have become useful as anti-glare rearview mirrors in automobiles.

Devices of variable transmittance to electromagnetic radiation wherein the electromagnetic radiation is attenuated by electrochromic means are described, for example by Chang, "Electrochromic and Electrochemichromic Materials and Phenomena" in Non-emissive Electro-optic Displays, A. Kmetz and K. vonWillisen, eds. Pergamon Press New York, N.Y. 1976, pp. 155–196(1976).

Numerous electrochromic devices are known in the art. See, e.g. Manos, U.S. Pat. No. 3,451,741; Bredfelt et al, U.S. Pat. No. 4,0900,782; Shattuck and Sincerbox, U.S. Pat. No. 4,093,358; Cleacak et al., U.S. Pat. No. 4,139,276; Kissa et al., U.S. Pat. No. 3,453,038; Rogers U.S. Pat. Nos. 3,652,149, 3,774,988, and 3,873,185; and Jones et al., U.S. Pat. Nos. 3,282,157, 3,282,158, 3,282,160 and 3,283,656.

In addition to these devices, there are commercially available electrochromic devices and associated circuitry, see e.g. Byker et al., U.S. Pat. Nos. 4,902,108, 5,128,799, 5,202,787, 5,280,380, 5282,077, 5,294,376 and 5,336,448; Bechtel et al., Canadian Pat No. 1,300,945, U.S. Pat. Nos. 5204778 and 5,451,822; Bauer et al., U.S. Pat. No. 5,434,407 and Tonar, U.S. Pat. No. 5,448,397. Each of these patents is commonly assigned with the present invention and the disclosures of each including the references contained therein are hereby incorporated in their entirety by reference.

It is desirable to use reversibly variable transmittance filters in architectural windows, skylights and in windows and sunroofs for automobiles in order to allow for user control of the transmittance through the same. For example, it is desirable to reduce the amount of sunlight, and hence glare and heat, transmitted through a window at specific times of the day and year, while allowing for higher transmittance at other times. In addition, fading of materials within the building or vehicle can be reduced by reducing the sunlight transmitted through a window.

Electrochromic devices typically include a structure similar to that shown in FIG. 1. Specifically they include a transparent substrate 12 and a second substrate 14 which are arranged in a parallel, spaced-apart relationship. The electrochromic devices also typically include an electrically conducting layer forming electrode 16 on the interior surface of substrate 12. Transparent conductive coatings or a metallic mesh or grid can be used for this electrically conducting layer. A second electrode 18 is provided on the interior surface of substrate 14. A seal 20 is provided to secure the substrates together and to provide a chamber 22 between the substrates in which an electrochromic medium 24 is disposed. Electrical connection can be made to the electrodes 16 and 18 by clips (26 and 28) conductive pastes, solders, etc. The application of a sufficient potential to the electrodes causes the electrochromic medium to reversibly modulate electromagnetic radiation incident through device.

The electrochromic medium 24 generally includes electrochromic anodic and cathodic materials that upon activation, due to the application of an electronic voltage or potential, exhibit a change in absorbance at one or more wavelengths of the electromagnetic spectrum. Commonly electrochromic devices have been solution-phase, electrodeposition or solid metal oxide type devices.

Heretofore, electrochromic devices have not found wide acceptance as light filters in windows, skylights or automobile windows or sunroofs due in part to the effects of sunlight, specifically UV radiation (400–200 nm) on the materials within the electrochromic medium. In the medium 24 as the anodic and cathodic materials are oxidized and reduced, they undergo changes in their electronic configuration. These electronic configuration changes result in the changes in absorbance and also result in the possibility of new, and possibly detrimental chemical reactions taking place. If one or more of these reactions leads to a product that cannot be returned to the inactivated form of the anodic or cathodic material and/or results in a colored product, the medium is said to undergo degradation. This degradation can lead to residual tints or colors in the device in its unactivated state or loss of coloration capacity when the device is activated. These reactions can be initiated by photons or by the increase in temperature a device endures when it is activated in sunlight.

Attempts to overcome the effect of sunlight on the electrochromic medium have included the addition to the electrochromic medium of certain UV absorbing materials, such as stabilizers, or solvents which absorb in the UV, to the medium, see Varaprasad et al., U.S. Pat. Nos. 5,140,455, 5,340,503 and 5,725,809. Alternatively placing an UV blocking barrier in front of the electrochromic medium has been described, see e.g. Lynam U.S. Pat. No. 5,864,419. These two methods have also been combined see e.g. Lynam U.S. Pat. No. 5,073,012. These attempts, while having somewhat improved the stability of the electrochromic medium, still have not lead to an electrochromic medium with acceptable daylight stability, and therefore have yet to lead to a commercially successful electrochromic device useful as a window, skylight or automotive window glazing.

Thus the need still exists for an electrochromic medium that has enhanced stability. In addition, materials with enhanced stability will be useful in making an electrochromic medium with enhanced stability.

SUMMARY

The invention is related to materials that show enhanced stability against harmful radiation, especially under conditions where an electrochromic device is changing from its high to low transmittance condition. These materials have at least one of the anodic and cathodic electroactive materials having a redox center which is linked by a bridging unit to an energy receptor site. The energy receptor sites that have proven to be useful have allowed electronic transitions that are less than about 3.5 eV above the ground state.

DETAILS

Figure 1:
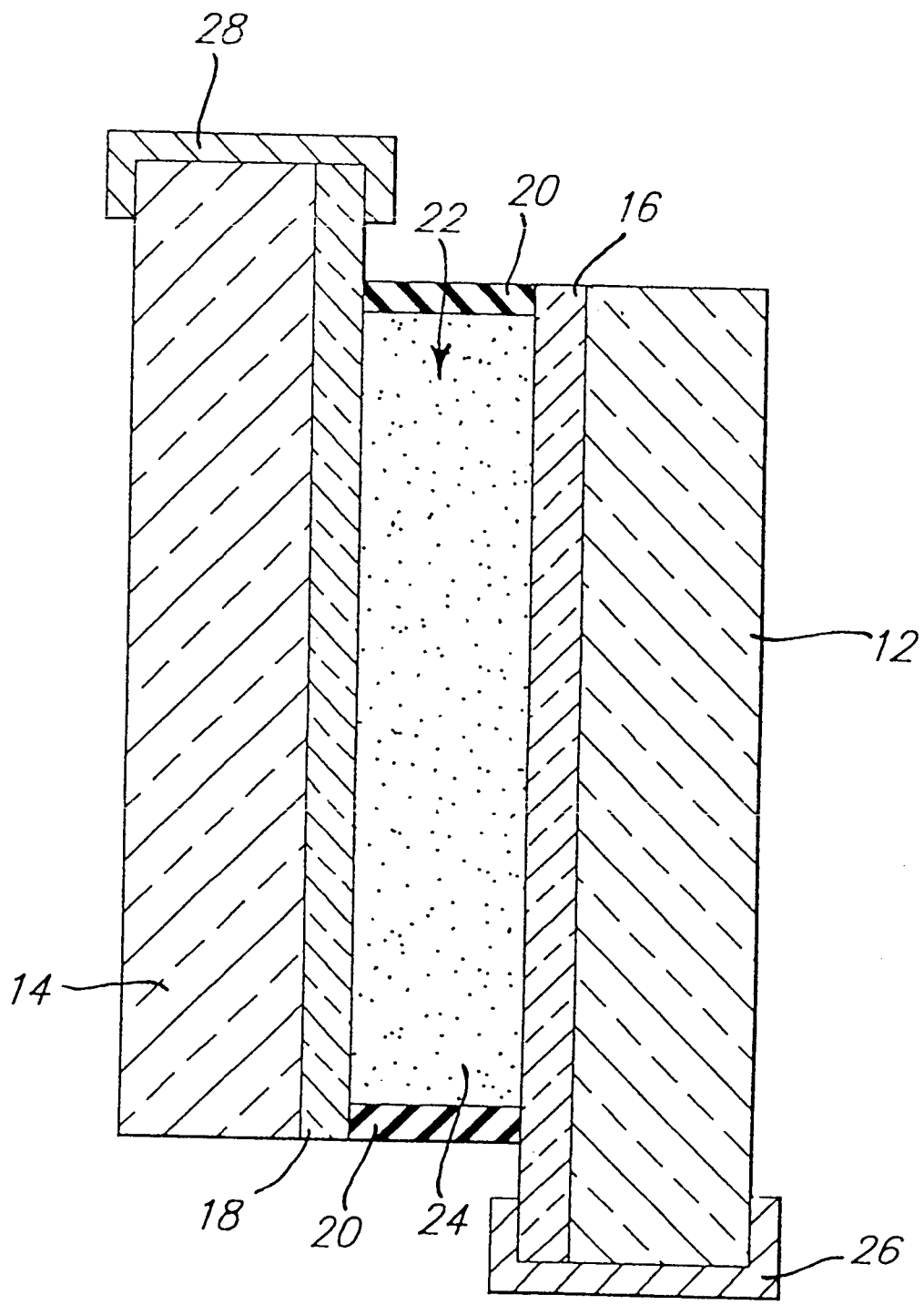
FIG. 1 represents the cross section of an electrochromic device.

Referring again to FIG. 1, the electrochromic device provided has a transparent substrate 12 with an electrically conductive layer 16 on its inward facing surface. The device further includes a second substrate 14 with an electrically conductive layer 18 on its inward facing surface. Substrates 12 and 14 are preferably parallel to one another with a seal 20 disposed between the substrates to define a chamber 22.

If an electrochromic window is desired, the substrates 12 and 14 in FIG. 1 will both be transparent. Transparent substrates may be made from any material which has sufficient transparency and strength to perform acceptably in the environmental conditions to which the device will be exposed. Substrates 12 and 14 could comprise any type of borosilicate glass, soda lime glass, float glass or any other material, such as, a polymer or plastic that is transparent in the visible region of the electromagnetic spectrum. Substrates 12 and 14 are preferably sheets of glass. If a mirror is desired substrate 14 preferably meets the requirements above except that it is no longer required to be transparent, and therefore may comprise polymers, metals, colored or non-transparent glass and ceramics. In addition, a mirror preferably has a reflector (not shown) is disposed on one surface of substrate 14.

Electrically conducting layers 16 and 18 may be made of any material which bonds well to substrates 12 and 14, is resistant to corrosion to any materials within the electrochromic device, is resistant to corrosion by the atmosphere, has good electrical conductivity and is able to be disposed on substrates 12 and 14 in such a way as to result in an electrochromic device having acceptable optical characteristics for its intended use. Transparent conductive coatings, for example, may be fluorine doped tin oxide, doped zinc oxide, zinc doped indium oxide, tin doped indium oxide (ITO) or other transparent conductors. Metals, either in thin layers or disposed in a pattern give devices that are transparent as well. Preferred conductivity for the layers 16 and 18 is less than 40 ohms per square with less than 20 ohms per square being more preferred. Copending U. S. patent application Ser. No. 09/343,345 entitled "Electrode Design for Electrochromic Devices" filed Jun. 30, 1999, hereby incorporated herein by reference teaches alternate methods for disposing electrically conductive layers within the electrochromic device.

Electrical contact is made to the electrically conducting layers through electrical contact means 26 and 28. The requirements for contact means 26 and 28 and conductive layers 16 and 18 are similar, corrosion resistance and good conductivity, however contact means 26 and 28 have no limits regarding their optical properties. Thus, metal clips and metal filled, or conducting, epoxy or solders can be used.

The performance requirements for a perimeter seal member 20 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not adversely interact with or poison the electrochromic material it is meant to contain and protect. U.S. patent application Ser. No. 09/158, 423 entitled "Improved Seal For Electrochromic Devices" filed Sep. 21,1998, now U.S. Pat. No. 6,157,480, teaches an improved seal for use in windows and mirrors. This application is hereby incorporated herein by reference. The perimeter seal can be applied by means commonly used in the LCD industry such as by silk-screening or dispensing.

The electrochromic medium includes electrochromic anodic and cathodic materials that can be grouped into the following categories:

(i) Single layer—the electrochromic medium is a single layer of material which may include small nonhomogeneous regions and includes solution phase devices where a material is contained in solution in the ionically conducting electrolyte and remains in solution in the electrolyte when electrochemically oxidized or reduced. Solution phase electroactive materials may be contained in the continuous solution phase of a cross linked is polymer matrix in accordance with the teachings of U.S. patent application Ser. No. 08/616,967, now U.S. Pat. No. 5,928,572, entitled "IMPROVED ELECTROCHROMIC LAYER AND DEVICES COMPRISING SAME" or International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

At least three electroactive materials, at least two of which are electrochromic can be combined to give a pre-selected color as described in U.S. patent application Ser. No. 08/832, 596 entitled "AN IMPROVED ELECTROCHROMIC MEDIUM CAPABLE OF PRODUCING A PRESELECTED COLOR"

The anodic and cathodic materials can be combined or linked by a bridging unit as described in International Application Serial No. PCT/WO97/EP498 entitled "ELECTROCHROMIC SYSTEM". It is also possible to link anodic materials or cathodic materials by similar methods. The concepts described in these applications can further be combined to yield a variety of electrochromic materials that are linked.

Additionally a single layer medium includes the medium where the anodic and cathodic materials can be incorporated into the polymer matrix as described in International Application Serial No. PCT/WO98/EP3862 entitled "ELECTROCHROMIC POLYMER SYSTEMS" or International Patent Application Serial No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES".

Also included is a medium where one or more materials in the medium undergoes a change in phase during the operation of the device, for example a deposition system where a material contained in solution in the ionically conducting electrolyte which forms a layer, or partial layer on the electronically conducting electrode when electrochemically oxidized or reduced.

In these single layer devices the electrochromic medium includes at least one anodic and one cathodic material, with at least one being electrochromic. Generally the materials are colorless or nearly colorless in their unactivated state, so that when the potential difference across the electrodes is zero the electrochromic medium is colorless or nearly colorless. When a sufficient potential difference is applied between the electrodes 16 and 18 at the cathode the cathodic species are reduced, i.e. accept electrons from the cathode.

In a similar fashion the anodic species are oxidized at the anode i.e. they donate electrons to the anode. As the cathodic and anodic species in the electrochromic medium 24 accept and donate electrons to and from the electrodes 16 and 18 at least one species becomes colored. The anodic and cathodic species in medium 24 return to their unactivated state when they exchange electrons towards the center of chamber 22. The activated species can reach this "recombination zone" through various routes including diffusion of the activated forms themselves, diffusion of charge, migration, etc. This self-erasing process allows the cell to clear when the potential is removed. As long as the potential applied is large enough for the electrochemical oxidation and reduction to take place the electrochromic cell will be colored.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide and vanadium oxide. A medium which contains one or more organic electrochromic layers, such as polythiophene, polyaniline or polypyrrole attached to the electrode would also be considered a multilayer medium.

In addition the electrochromic medium may also contain other materials such as light absorbers, light stabilizers, thermal stabilizers, antioxidants, thickeners or viscosity modifiers or tint providing agents.

EC devices having as a component part an EC medium have been, or can be used in a wide variety of applications wherein the transmitted or reflected light can be modulated. Such devices include rear-view mirrors such as are used for vehicles; windows for the exterior of a building, home or vehicle; skylights for buildings including tubular light filters; windows in office or room partitions; display devices; contrast enhancement filters for displays; light filters for photographic devices and light sensors; and indicators for power cells and batteries.

In accordance with the present invention, the electrochromic medium comprises an electrochromic compound that has one or more redox centers, which may be either an anodic or cathodic component linked by a linking group having a series of σ and π bonds to one or more energy receptor sites, where the energy receptor site is capable of accepting excited state energy from the redox center or energy from outside of the electrochromic compound.

The use of the stable materials of the present invention reduces or eliminates the need for added UV absorbers, light stabilizers, thermal stabilizers or antioxidants.

If the redox center is cathodic, it can be selected from the group comprising 4,4'-bipyridyl compounds (including viologens), 2,2'-bipyridyl compounds, quinones, cyano compounds, triazabenzenes, etc. Some of the presently preferred cathodic materials have the following structures:

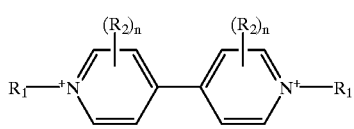

[I]

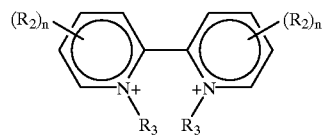

[II]

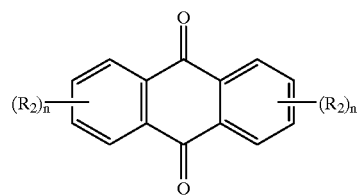

[III]

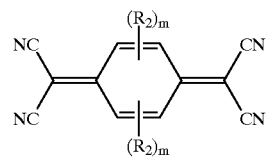

[IV]

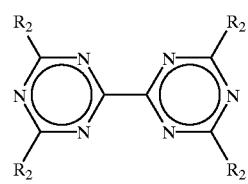

[V]

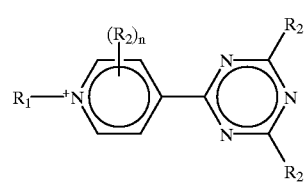

[VI]

where $R_1$ is selected from alkyl $C_1$ to $C_{20}$, alkynl $C_2$ to $C_{20}$, and aryl $C_5$ to $C_{20}$; and may optionally contain one or more of ester, ether, aryl, amine, urethane, ammonium, thioester, alkene, alkyne functional groups, etc, and additionally may function as a bridge to an energy receptor site;

$R_2$ is independently selected from alkyl $C_1$ to $C_{10}$, alkyl $C_2$ to $C_{10}$, aryl $C_5$ to $C_{20}$, ester, ether, aryl, amine, urethane, ammonium, thioester, alkene, alkyne functional groups, etc, and additionally function as a bridge to an energy receptor site;

$R_3$ is selected from alkyl $C_1$ to $C_5$ or an ethyl, propyl or ethylene bridge; and n=0–4; m=0–2.

If the redox center is anodic, it can be selected from the group comprising dihydrophenazines, benzimidazole azines, benzoxazole azines, benzathiazole azines, diaminophenylenes, benzidines, tetrathiafulvolines, phenathiazines, phenoxazines, dithiazines, ferrocenes, etc.

Some of the presently preferred anodic materials have the following structures:

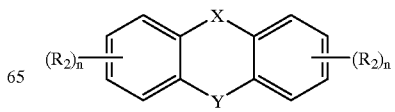

[VII]

-continued

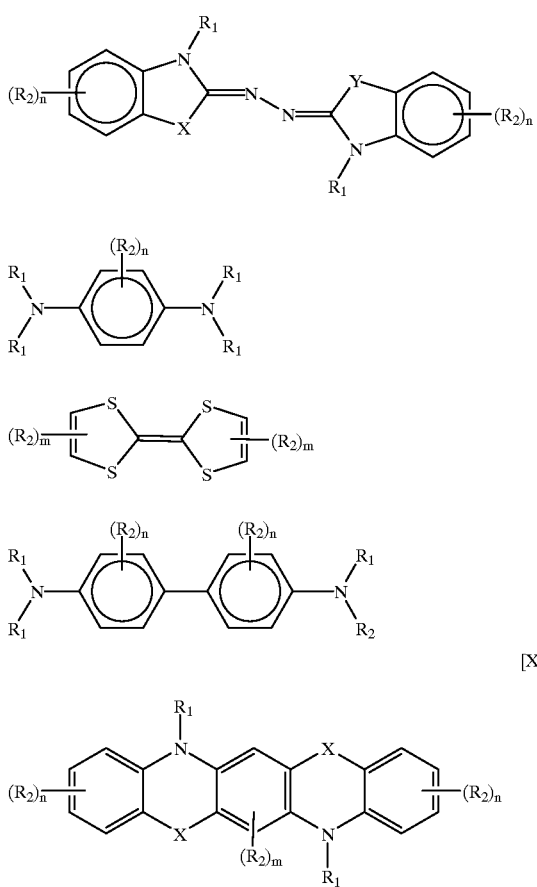

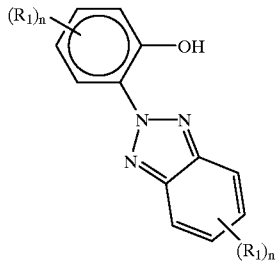

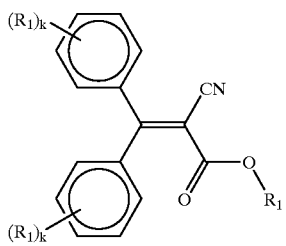

where $R_1$ and n are described above and k=0–5.

The energy receptor site can absorb energy directly, i.e. from outside the electroactive compound, however, it is also possible for them to accept excited state energy from the redox center. The use of a near-infrared absorber should enhance stability since the excited state energy of the receptor site is lower in energy than the excited state resulting from the absorbance of a visible photon. In addition the linkage of an energy receptor that also has UV absorbing character can enhance the UV blocking capabilities in the medium by increasing the effective solubility of UV absorbing chromophores. For example in the case of 1-methyl-1[[1-benzotriazole-2-hydroxy-3-t-butyl-5-propyl (propionate)-[benzene]]-4,4-bipyridinium bis-tetrafluoroborate (compound IV in Example 2) the solubility in propylene carbonate is much higher than the corresponding Tinuvin analog. Alternatively the compound 1,1'-[1-benzotriazole-2-hydroxy-3-t-butyl-5-propyl (propionate)-[benzene]]-4,4'-bipyridinium bis-tetrafluoroborate (compound XVI in example 3) would be expected to have, at the same molar concentration, twice the absorbance as Tinuvin P.

The linking group (or unit) contains a series of σ and π bonds, that typically comprise $C_1$–$C_{20}$ optionally containing one or more, ester, ether, aryl, amine, urethane, ammonium, thioester, alkene, alkyne functional groups, etc., and combinations thereof. The linking group can additionally be a direct chemical bond.

Where X and Y can be independently selected from the group consisting of $NR_1$, S, and O; and $R_1$, $R_2$, n and m are the same as described above.

The compounds of the present invention can all be commonly described as having a redox center (R) linked (L) to a center that serves as an energy receptor (E).

Redox centers that are useful in this invention can be either anodic or cathodic. The anodic redox centers will preferably undergo electrochemical oxidation to form an activated, oxidized form that is chemically stable, or does not undergo significant adverse and irreversible chemical reactions in the electrochromic medium. Similarly, the cathodic redox center will be chemically stable in its activated form after undergoing electrochemical reduction. One method of determining chemical stability is to examine a cyclic voltammogram. The presence of a chemically reversible wave in a suitable solvent is an indication of a chemically stable material in its activated form.

The energy receptor site can be selected from analogs of known UV absorbers, such as 2-hydroxy benzotriazoles, cyano acrylates, 2-hydroxy benzophenones, and the like. In addition UV quenchers, such as zinc or nickel chelates; antioxidants, such as hydroquinones and hindered amines; or near-infrared absorbers can also be used.

Presently preferred energy receptors are shown in the following:

In addition to the R—L—E (R=redox center, L=linkage and E=energy receptor) scheme, various combinations are possible including with L, L' and L", R, R', E, E' the same or different.

E—L—R—L'—E', E—L—R—L'—R'—L"—E',
E—L—R—L'—R', R—L—E—L—R R and R' can be both anodic redox centers or both cathodic redox centers or one anodic and one cathodic redox center. Additionally, polymeric systems or a polymeric linking group may be used with R and E groups attached along the chain into a crosslinked polymer matrix.

The compounds of the present invention can be utilized in either a single or multi-layer medium. In addition to the following examples of the preparation of materials and their use in single-layer devices further describe the invention.

EXAMPLE 1

Synthesis of 5-methyl-10-[1-benzotriazole-2-hydroxy-3-t-butyl-5-propyl-(propionate)-[benzene]] 5,10-dihydrophenazine.

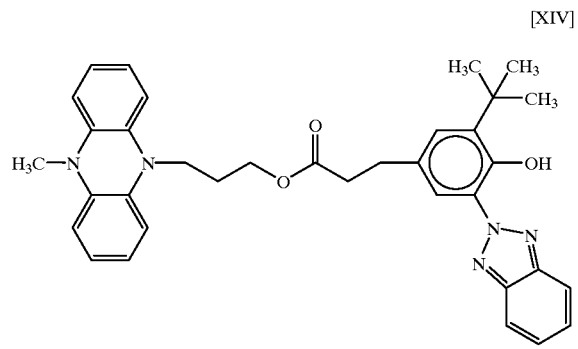

[XIV]

5-methyl phenazinium methosulfate was prepared by quaternizing 36.0 g (200 mmoles) of phenazine with 25.2 g (200 mmoles) of dimethyl sulfate in 300 ml of nitrobenzene in a 500 ml 3-neck, round-bottom flask. The mixture was gradually heated to 80 degrees Celsius and then held at that temperature for 2 hours. After cooling, the methosulfate salt was filtered off and washed with ethanol for a 53.8% yield.

To a 1 liter 3-neck, round-bottom flask was added 127.4 g (100 mmoles) of Tinuvin 213 (Ciba-Geigy, average MW 637 g/mol) along w/600 ml of methanol and 100 ml of 10 M NaOH. This solution was refluxed for 16 hours, then cooled and transferred to a separating funnel. 500 ml of water and 500 ml of diethyl ether was also added to the separating funnel. The separate funnel was shaken vigorously and allowed to settle after which the ether layer was removed and discarded. After a second ether wash, the aqueous layer was acidified into a fresh ether layer and the free acid was extracted into this ether layer. The ether extract was isolated and combined with a second ether extract. This was concentrated and the residue re-dissolved in 500 ml of hot ethanol. After 16 hours at zero degrees Celsius, the free acid was filtered off and dried to 59.7 g of a white solid.

This free acid was quantitatively converted to the corresponding acid chloride by the following method. 204 g (60 mmoles) of the carboxylic acid was added to a 250 ml round bottom flask along with 100 ml of thionyl chloride. This mixture was refluxed under a dry nitrogen atmosphere for 2 hours, then was cooled and residual thionyl chloride removed via distillation. The resulting tan colored oil was identified, as the acid chloride by FTIR and DIP/MS.

The phenazinium methosulfate salt was then reduced and alkylated in a one-pot reaction as described in U.S. patent application Ser. No. 09/280,396 entitled "ONE POT SYNTHESIS OF 5,10-DIHYDROPHENAZINE COMPOUNDS AND 5,10-SUBSTITUTED DIHYDROPHENAZINES" now U.S. Pat. No. 6,242,602, 30.6 g of methylphenazinium methosulfate was charged to a 1 L 3-neck, round-bottom flask along with 41.7 g (300 mmoles) of 3 bromopropanol, 20.1 g (115 mmoles) sodium hydrosulfite, 11.7 g (110 mmoles) sodium carbonate 4.7 g (15.0 mmoles) methyltributyl ammonium chloride, 200 mls of acetonitrile and 10 mls of water. This mixture was stirred vigorously and refluxed under a nitrogen atmosphere for 24 hours.

After this time, 300 ml of water was dripped into the reaction slurry and about half of the acetonitrile was distilled off. The resulting solution was cooled to room temperature and 2 hours later an off-white crystalline product was filtered off. It was washed with water and dried under vacuum at 60 degrees Celsius to 14.6 g for 53.5% yield. This alkylated phenazine contains the redox center for the final product.

The convergent step; an esterification of the acid chloride attached to the benzotriazole, with the alcohol group attached to the phenazine was carried out as follows. 21.5 g (60 mmoles) of acid chloride was added to a 500 one neck round bottom flask and dissolved in 400 ml of toluene. To this solution was added 20 ml of pyridine and 14.6 g (57.5 mmoles) of the 5-methyl-10-propanol-5,10-dihydrophenazine. The solution was heated to reflux for 2 hours. It was then cooled and the pyridinium hydrochloride filtered off. The remaining solution was concentrated and loaded to a silica gel column for chromatography. A 20% ethyl acetate/80% hexane mixture was used as the eleunt. From this 19 g of crude product was isolated and was then recrystallized from 600 ml of hot acetonitrile. After cooling and crystallizing overnight, a light yellow crystalline product was isolated and dried under vacuum at 70 degrees Celsius to yield 16.1 g of desired product.

EXAMPLE 2

Synthesis of 1-methyl-1[[1-benzotriazole-2-hydroxy-3-t-butyl-5-propyl (propionate)-[benzene]]-4,4-bipyridium bis-tetrafluoroborate.

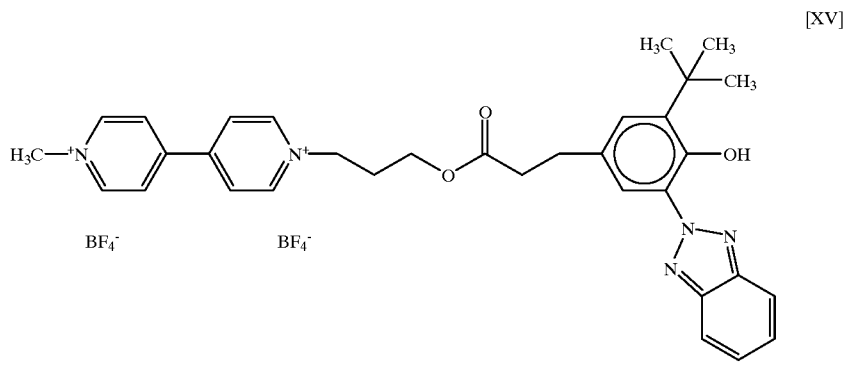

[XV]

1-methyl-4,4'-bipyridinium mono hexafluorophosphate was prepared in a 1 L, 3 neck round bottom flask. 156.0 g (1 mole) of 4,4'-bipyridal, 127.8 g (900 mmoles) of iodo methane and 500 ml of acetone was added to the flask and was stirred for 16 hours at room temperature. The quaternized bipyridiniurn iodide salt was filtered and washed with acetone. This solid was converted to the hexafluorophosphate salt, by dissolving in 600 ml of hot water and 500 ml of ethanol. To this solution was added 200 g (1.24 moles) of ammonium hexafluorophosphate. The solution was allowed to cool overnight. 173 g of the mono-methyl-bipyridinium hexafluorophosphate salt was isolated and dried the following day. This salt contains the redox active center for the final product.

The UV absorbing center was prepared similarly to the procedure in Example 5. The acid chloride of the benzotriazole component was then reacted with 3-bromopropanol to form a bromopropylester. 29.5 g (82.5 mmoles) of the acid chloride was added to a 1 L 3-neck, round-bottom flask and dissolved into 500 ml of toluene under a dry nitrogen atmosphere. To this solution was added 13.9 g (100 mmoles) of 3-bromo-propanol and the resulting solution was heated to 50 degrees Celsius. At this point, 20 ml of pyridine was dripped into the 50 degrees Celsius reaction. The reaction was allowed to stir overnight at 50 degrees Celsius. The next day, the reaction was cooled to room temperature and the by-product pyridinium hydrochloride was filtered off. It was then concentrated to oil and the structure confirmed by GC/MS.

In a convergent step, 6.6 g (21.5 mmoles) of the monomethyl bipyridinium hexafluorophosphate salt was added to a 500 ml flask along with 13.8 g (30 mmoles) of the bromopropylester of the benzotriazole. Both dissolved in 300 ml of refluxing acetonitrile. After 10 days, the acetonitrile reaction slurry was cooled to room temperature and the quaternized product filtered off and washed with acetone. This 8.7 g of solid was dissolved in 250 ml of hot water, to which was added 100 ml of an aqueous 1M sodium tetrafluoroborate solution. The precipitated bis-tetrafluoroborate salt was recrystallized twice in acetonitrile/water solutions containing sodium tetrafluoroborate. 4.4 g of the off-white crystalline product was isolated, which was analyzed as high purity material by LC/MS.

EXAMPLE 3

Synthesis of 1,1'-[1-benzotriazole-2-hyrox-3-t-butyl-5-propyl (propionate)-[benzene]]-4,4'-bipyridinium bis-tetrafluoroborate.

This compound was prepared from 4,4-bipyridal and the bromopropyl propionate ester of the benzotriazole described in Example 5 and Example 6 above. To a 250 ml 1 neck round bottom flask was added 2.0 g (12.5 mm) of 4,4'-bipyridal and 13.5 g (29.3 g mm) of the bromopropyl propionate ester of the benzotriazole. These compounds were dissolved in 150 ml of acetonitrile and heated to reflux for 8 days. The reaction slurry was cooled to room temperature and then the dibromide salt was filtered off and washed with acetone. The dibromide salt was then dissolved in 500 ml of hot water and to it was added 100 ml of 1 M sodium tetrafluoroborate solution. This aqueous solution was cooled overnight at zero degrees Celsius. The next day, the precipitated bis-tetrafluoroborate salt was filtered off and washed with water. It was then recrystallized twice from a 1:1 solution of water and n-propanol with 10 mmole of sodium tetrafluoroborate in solution. A total of 5.2 g of an off-white crystalline product was isolated and was characterized by LC/MS.

EXAMPLE 4

Two electrochromic windows 2"×5" were constructed using two pieces of TEC glass (LOF, Toledo, Ohio) and an epoxy seal with spacers of 250 μm dimension. The windows were filled with the following solution:
  17 mM bis 1,1'-[3-(phenyl(n-propyl)]-4,4' bipyridinium bis tetrafluoroborate
  14 mM 5,10-dihydro, 5,10-dimethylphenazine
  30 mM Tinuvin P
  3 wt. % PMMA in propylene carbonate The windows were subjected to the following test: Under simulated solar irradiance (Atlas Weather-Ometer 0.55 w/m 2 nm @ 340 nm), a potential of 1.2 V was applied to each window for a period of 30 seconds then the potential was switched to 0V for 30 seconds. This switching was done continuously for one week, then the windows were evaluated. The windows were evaluated by measuring the reflectance of the window (CIE-D65 Y value) over a white standard tile using an X-Rite SP 68 portable sphere spectrometer. The devices went from Y values of 60.90 and 60.89, to 44.07 and 42.24 respectively after 56,834 cycles.

EXAMPLE 5

Windows similar to Example 4 were constructed and filled with:
  15 mM 1,1'-[(3-phenyl (n-propyl))]4,4'-bipyridinium bis (tetrafluoroborate)

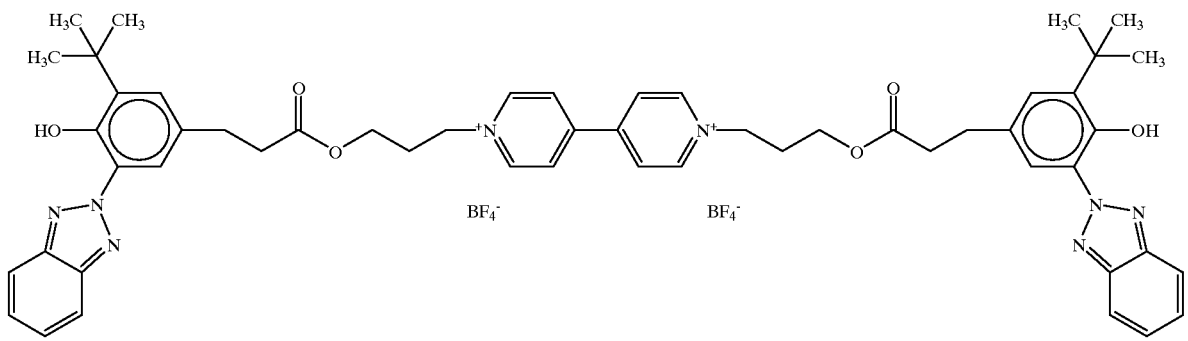

[XVI]

15 mM compound XIV from Example 1

30 mM Tinuvin P 3 wt. % PMMA in propylene carbonate

The windows were subjected to the following test: Under simulated solar irradiance (Atlas Weather-Ometer 0.55 w/m 2 nm @ 340 nm), a potential of 1.2 V was applied to each window for a period of 30 seconds then the potential was switched to 0V for 30 seconds. This switching was done continuously for one week, then the windows were evaluated. The windows were evaluated by measuring the reflectance of the window (CIE-D65 Y value) over a white standard tile using an X-Rite SP 68 portable sphere spectrometer. These windows went from Y values of 61.23 and 61.30 respectively to 50.38 and 51.00, respectively after 56,834 cycles.

EXAMPLE 6

To demonstrate the enhanced stability under UV radiation of the compounds of the invention the following example was done; windows were filled with the following two solutions.

SOLUTION A 0.696 g of compound XV of example 2

0.067 g of 5,10-dihydro, 5,10-dimethylphenazine were dissolved into 20 ml of propylene carbonate.

SOLUTION B 1.334 of 1,1'-dioctyl-4,4'-bypyridinium bis tetrafluoroborate 0.168 g of DMP were dissolved in 50 ml of propylene carbonate.

Solution A was used to fill windows as described in Example 4. One window was tested with simulated solar irradiance (Atlas Weather-Ometer 1.1 w/m 2.nm at 340 nm) in its high transmission state and after 500 hours of exposure the appearance had changed very little. One window was tested in a similar environment except this device was cycled between its high and low transmittance state in the presence of irradiation. This device also showed very little change in appearance after 500 hours of exposure and 32,000 cycles.

Solution B was used to fill windows as described in Example 4. These windows were tested under simulated solar irradiance, as were windows with Solution A (Atlas Weather-Ometer 1.1 w/m 2.nm at 340 nm). The window that remained in its high transmission state showed a noticeable change in color; a red-brown color was clearly evident. The window that had alternated between high and low (0 and 1.2 V) transmittance had developed a blue tint after 500 hours of exposure and 32,000 cycles.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic device, comprising:
    (a) at least one substantially transparent substrate having an electrically conductive material associated therewith;
    (b) an electrochromic medium which comprises:
        (1) a solvent;
        (2) a cathodic electroactive material; and
        (3) an anodic electroactive material, wherein at least one of the anodic and cathodic electroactive materials is electrochromic, and further wherein at least one of the anodic and cathodic electroactive materials is at least partially dissolved in the solvent; and
    (c) wherein at least one of the anodic and cathodic materials is linked by a bridging unit to an energy receptor site.

2. The electrochromic device according to claim 1, wherein the energy receptor site is capable of accepting excited state energy from a redox center of the electrochromic material or energy from outside of the electrochromic material.

3. The electrochromic device according to claim 1, wherein the cathodic electroactive material comprises a viologen.

4. The electrochromic device according to claim 1, wherein the cathodic electroactive material is selected from at least one of the group comprising:

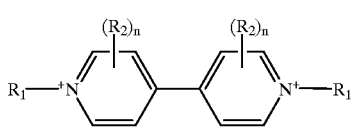

[I]

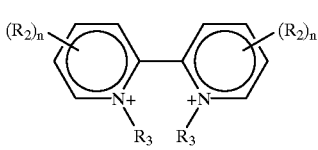

[II]

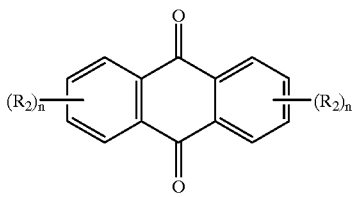

[III]

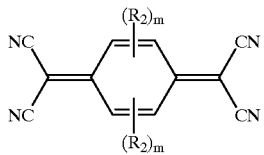

[IV]

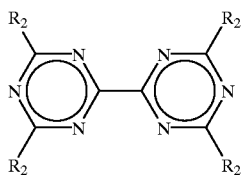

[V]

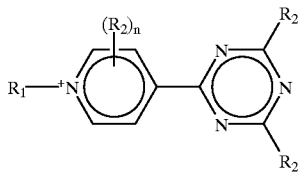

[VI]

wherein $R_1$ is independently selected from alkyl $C_1$ to $C_{20}$, alkynl $C_2$ to $C_{20}$, and aryl $C_5$ to $C_{20}$; and may optionally contain one or more of an ester, ether, aryl, amine, urethane, ammonium, thioester, alkene, and alkyne functional group, and additionally may function as a bridge to an energy receptor site; wherein $R_2$ is independently selected from alkyl $C_1$ to $C_{10}$, alkyl $C_2$ to $C_{10}$, aryl $C_5$ to $C_{20}$, and may optionally contain one or more of an ester, ether, aryl, amine, urethane, ammonium, thioester, alkene, and alkyne functional groups, and additionally may function as a bridge to an energy receptor site; wherein $R_3$ is independently selected from alkyl $C_1$ to $C_5$ or an ethyl, propyl or ethylene bridge; wherein n=0–4 and wherein m=0–2.

5. The electrochromic device according to claim 4, wherein the cathodic electroactive material comprises:

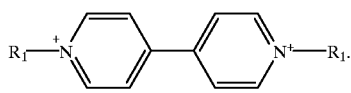

[XVIII]

6. The electrochromic device according to claim 1, wherein the anodic electroactive material comprises an azine group containing compound.

7. The electrochromic device according to claim 1, wherein the anodic electroactive material is selected from at least one of the group comprising:

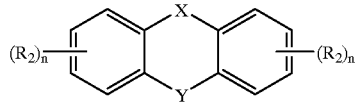

[VII]

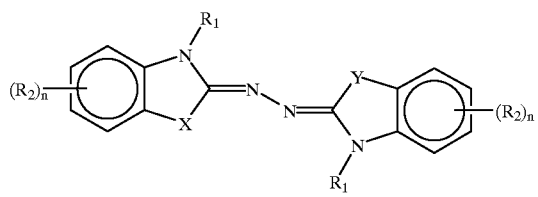

[VIII]

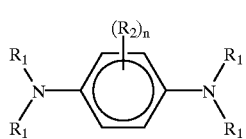

[IX]

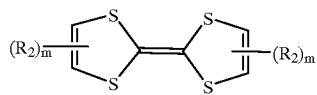

[X]

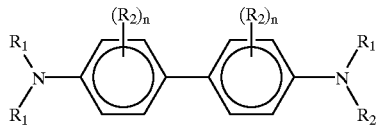

[XI]

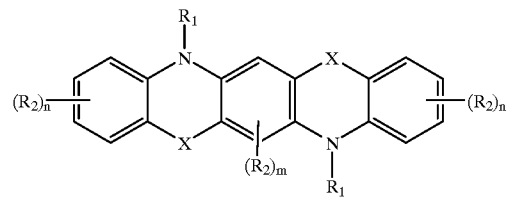

[XVII]

wherein X and Y are independently selected from N, $NR_1$, S, and O; wherein $R_1$ independently is selected from alkyl $C_1$ to $C_{20}$, alkynl $C_2$ to $C_{20}$, and aryl $C_5$ to $C_{20}$; and may optionally contain one or more of an ester, ether, aryl, amine, urethane, ammonium, thioester, alkene, and alkyne functional group, etc, and additionally may function as a bridge to an energy receptor site; wherein $R_2$ is independently selected from alkyl $C_1$ to $C_{10}$, alkyl $C_2$ to $C_{10}$, aryl $C_5$ to $C_{20}$, and may optionally contain one or more of an ester, ether, aryl, amine, urethane, ammonium, thioester, alkene, and alkyne functional group, and additionally may function as a bridge to an energy receptor site; wherein n=0–4; and wherein m=0–2.

8. The electrochromic device according to claim 7, wherein the anodic electroactive material comprises:

[XVII]

9. The electrochromic device according to claim 1, wherein energy receptor site is selected from at least one of the group comprising:

[XII]

[XIII]

wherein $R_1$ is independently selected from alkly $C_1$ to $C_{20}$, alkynl $C_2$ to $C_{20}$, and aryl $C_5$ to $C_{20}$; and may optionally contain one or more of an ester, ether, aryl, amine, urethane, ammonium, thioester, alkene, and alkyne functional group, and additionally may function as a bridge to an energy receptor site; wherein n=0–4; and wherein k=0–5.

10. The electrochromic device according to claim 1, wherein energy receptor site is selected from at least one of the group comprising 2-hydroxybenzotriazoles, diphenylcyanoacrylates, 2-hyrdoxybenzophenones, and combinations thereof.

11. An electrochromic device, comprising:

(a) a first substantially transparent substrate having an electrically conductive material associated therewith;

(b) a second substantially transparent substrate having an electrically conductive material associated therewith, (c) an electrochromic medium contained within a chamber positioned between the first and second substrates which comprises:
  (1) a solvent;
  (2) a cathodic electroactive material; and
  (3) an anodic electroactive material, wherein at least one of the anodic and cathodic electroactive materials is electrochromic, and further wherein at least one of the anodic and cathodic electroactive materials is at least partially dissolved in the solvent; and (d) wherein at least one of the anodic and cathodic materials is linked by a bridging unit to an energy receptor site.

12. The electrochromic device according to claim 11, wherein the energy receptor site is capable of accepting excited state energy from a redox center of the electrochromic material or energy from outside of the electrochromic material.

13. The electrochromic device according to claim 11, wherein the cathodic electroactive material comprises a viologen.

14. The electrochromic device according to claim 11, wherein the cathodic electroactive material is selected from at least one of the group comprising:

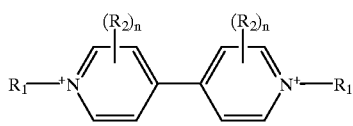
[I]

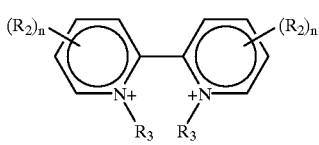
[II]

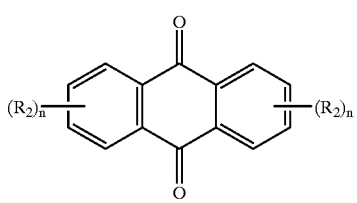
[III]

-continued

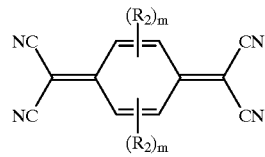
[IV]

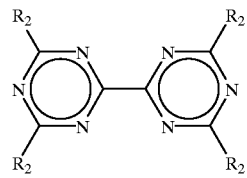
[V]

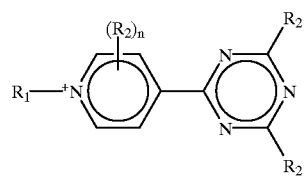
[VI]

wherein $R_1$ is independently selected from alkyl $C_1$ to $C_{20}$, alkynl $C_2$ to $C_{20}$, and aryl $C_5$ to $C_{20}$; and may optionally contain one or more of an ester, ether, aryl, amine, urethane, ammonium, thioester, alkene, and alkyne functional group, and additionally may function as a bridge to an energy receptor site; wherein $R_2$ is independently selected from alkyl $C_1$ to $C_{10}$, alkyl $C_2$ to $C_{10}$, aryl $C_5$ to $C_{20}$, and may optionally contain one or more of an ester, ether, aryl, amine, urethane, ammonium, thioester, alkene, and alkyne functional groups, and additionally may function as a bridge to an energy receptor site; wherein $R_3$ is independently selected from alkyl $C_1$ to $C_5$ or an ethyl, propyl or ethylene bridge; wherein n=0–4; and wherein m=0–2.

15. The electrochromic device according to claim 14, wherein the cathodic electroactive material comprises:

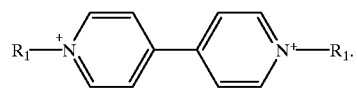
[XVIII]

16. The electrochromic device according to claim 11, wherein the anodic electroactive material comprises an azine group containing compound.

17. The electrochromic device according to claim 11, wherein the anodic electroactive material is selected from at least one of the group comprising:

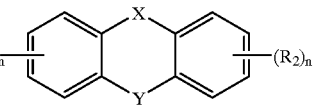
[VII]

-continued

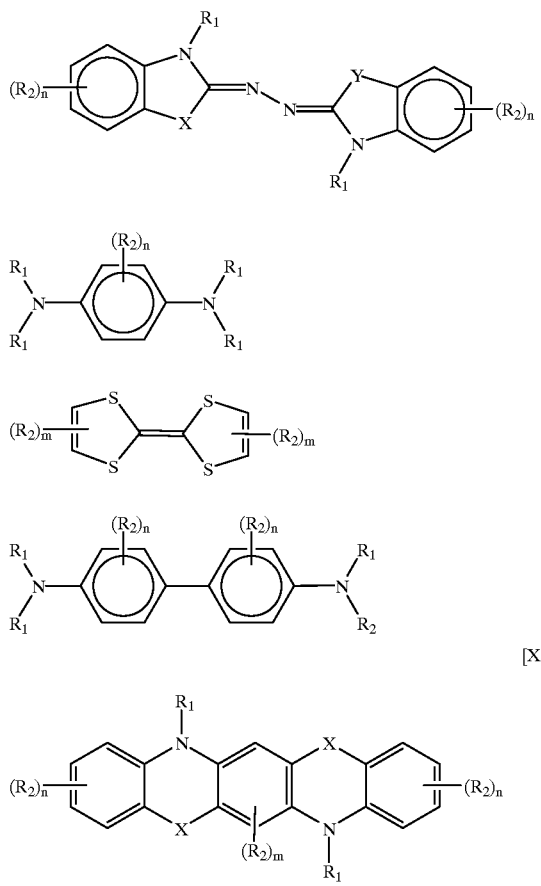

wherein X and Y are independently selected from N, NR$_1$, S, and O; wherein R$_1$ is independently selected from alkyl C$_1$ to C$_{20}$, alkynl C$_2$ to C$_{20}$, and aryl C$_5$ to C$_{20}$; and may optionally contain one or more of an ester, ether, aryl, amine, urethane, ammonium, thioester, alkene, and alkyne functional group, etc, and additionally may function as a bridge to an energy receptor site; wherein R$_2$ is indepenedently selected from alkyl C$_1$ to C$_{10}$, alkyl C$_2$ to C$_{10}$, aryl C$_5$ to C$_{20}$, and may optionally contain one or more of an ester, ether, aryl, amine, urethane, ammonium, thioester, alkene, and alkyne functional group, and additionally may function as a bridge to an energy receptor site; wherein n=0–4; and wherein m=0–2.

18. The electrochromic device according to claim 17, wherein the anodic electroactive material comprises:

[XVII]

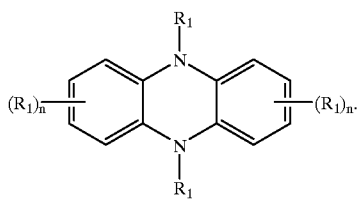

19. The electrochromic device according to claim 11, wherein energy receptor site is selected from at least one of the group comprising:

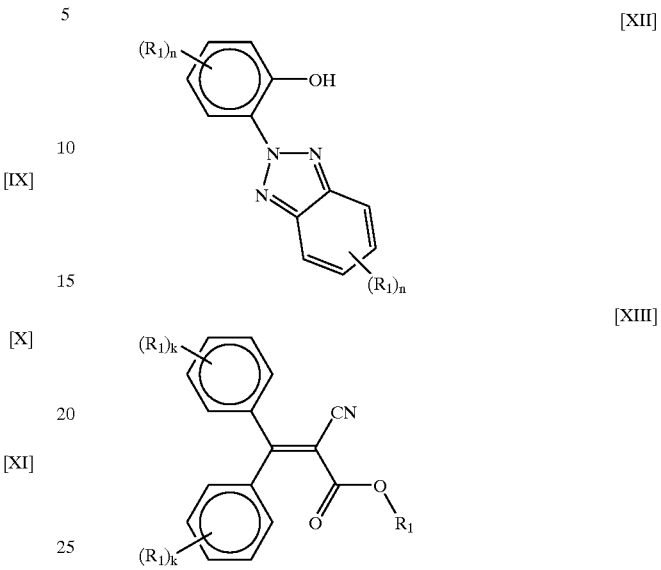

wherein R$_1$ is independently selected from alkyl C$_1$ to C$_{20}$, alkynl C$_2$ to C$_{20}$, and aryl C$_5$ to C$_{20}$; and may optionally contain one or more of an ester, ether, aryl, amine, urethane, ammonium, thioester, alkene, and alkyne functional group, and additionally may function as a bridge to an energy receptor site; wherein n=0–4; and wherein k=0–5.

20. The electrochromic device according to claim 11, wherein energy receptor site is selected from at least one of the group comprising 2-hydroxybenzotriazoles, diphenylcyanoacrylates, 2-hyrdoxybenzophenones, and combinations thereof.

21. An electrochromic device, comprising:
(a) a first substantially transparent substrate having an electrically conductive material associated therewith;
(b) a second substantially transparent substrate having an electrically conductive material associated therewith,
(c) an electrochromic medium contained within a chamber positioned between the first and second substrates which comprises:
 (1) a solvent;
 (2) a cathodic electroactive material; and
 (3) an anodic electroactive material, wherein at least one of the anodic and cathodic electroactive materials is electrochromic, and further wherein at least one of the anodic and cathodic electroactive materials is at least partially dissolved in the solvent; and
(d) stabilization means associated with the electrochromic device for exhibiting enhanced stability against harmful radiation relative to an electrochromic device without such stabilization means.

22. The electrochromic device according to claim 21, wherein the stabilization means comprises at least one of the anodic and cathodic materials being linked by a bridging unit to an energy receptor site.

* * * * *